United States Patent
Mason, Jr. et al.

(10) Patent No.: US 10,891,194 B2
(45) Date of Patent: Jan. 12, 2021

(54) VERSIONED FILE SYSTEM USING STRUCTURED DATA REPRESENTATIONS

(71) Applicant: Nasuni Corporation, Natick, MA (US)

(72) Inventors: Robert S. Mason, Jr., Uxbridge, MA (US); Andres Rodriguez, Boston, MA (US)

(73) Assignee: Nasuni Corporation, Boston, MA (US)

( * ) Notice: Subject to any disclaimer, the term of this patent is extended or adjusted under 35 U.S.C. 154(b) by 214 days.

(21) Appl. No.: 15/665,930

(22) Filed: Aug. 1, 2017

(65) Prior Publication Data

US 2017/0357549 A1    Dec. 14, 2017

Related U.S. Application Data

(63) Continuation of application No. 14/059,424, filed on Oct. 21, 2013, now Pat. No. 9,720,777, and a continuation of application No. 12/483,030, filed on Jun. 11, 2009, now Pat. No. 8,566,362.

(60) Provisional application No. 61/146,978, filed on Jan. 23, 2009.

(51) Int. Cl.
```
G06F 11/14      (2006.01)
G06F 16/11      (2019.01)
G06F 16/172     (2019.01)
G06F 16/182     (2019.01)
G06F 16/18      (2019.01)
G06F 16/901     (2019.01)
```

(52) U.S. Cl.
CPC ...... *G06F 11/1446* (2013.01); *G06F 11/1448* (2013.01); *G06F 11/1464* (2013.01); *G06F 16/128* (2019.01); *G06F 16/172* (2019.01); *G06F 16/183* (2019.01); *G06F 16/1873* (2019.01); *G06F 16/9027* (2019.01); *G06F 2201/805* (2013.01); *G06F 2201/84* (2013.01)

(58) Field of Classification Search
CPC ............. G06F 11/1446; G06F 16/1873; G06F 16/183; G06F 16/9027; G06F 16/172; G06F 16/128; G06F 11/1448; G06F 11/1464; G06F 2201/805; G06F 2201/84
USPC ......................................................... 707/646
See application file for complete search history.

(56) References Cited

U.S. PATENT DOCUMENTS 7,734,643 B1 *  6/2010  Waterhouse ............ G06F 16/10
                                                  707/770
2009/0248737 A1 * 10/2009  Shukla ...................... G06F 9/44
(Continued)

*Primary Examiner* — Evan Aspinwall
(74) *Attorney, Agent, or Firm* — David H. Judson

(57) ABSTRACT

A versioned file system comprises a set of structured data representations. At a first time, an interface creates and exports to a cloud data store a first structured data representation corresponding to a first version of the local file system. The first structured data representation is an XML tree having a root element, one or more directory elements associated with the root element, and one or more file elements associated with a given directory element. Upon a change within the file system, the interface creates and exports a second structured data representation corresponding to a second version of the file system. The second structured data representation differs from the first structured data representation up to and including the root element of the second structured data representation. The interface continues to generate and export the structured data representations to the data store.

11 Claims, 21 Drawing Sheets

(56) References Cited

U.S. PATENT DOCUMENTS

2009/0249284 A1* 10/2009 Antosz ...................... G06F 8/10
717/104
2011/0153697 A1* 6/2011 Nickolov .............. G06F 9/4856
707/827

* cited by examiner

```
/
/ .DS_Store
/animals
/animals/IMG_0997.jpg
/animals/IMG_1008.jpg
/animals/IMG_1020.jpg
/characters
/characters/IMG_1041.jpg
/characters/IMG_1043. jpg
/MobileMe Gallery - Best of Disney 2009.webloc
/people
/people/.DS_Store
/people/IMG_0935.jpg
/people/IMG_0944.jpg
/people/IMG_0989. jpg
/text
/text /Ronald Regan.txt
/text/Slogans.txt
```

```
<?xml version="1.0" ?>
<toc>
  <volume>volume1</volume>
  <manifest_ptr>
     <version>1</version>
     <start_time>2009-06-03T19:04:15Z</start_time>
     <end_time>2009-06-03T15:04:34Z</end_time>
     <handle>16uni1262054964.dm</handle>
  </manifest_ptr>
</toc>
```

*FIG. 14*

```
<?xml version="1.0" ?>
<manifest>
   <path>/Users/Rob/Downloads/cloudtest1</path>
   <version>1</version>
   <stat>
      <uid>501</uid>
      <gid>501</gid>
      <mode>040775</mode>
      <size>272</size>
      <atime>2009-05-22T15:13:40Z</atime>
      <mtime>2009-05-22T15:13:40z</mtime>
      <ctime>2009-05-22T15:13:40z</ctime>
   </stat>
   <chunk>
      <handle>16uni1045524506.dc</handle>
      <length>2138</length>
      <offset>0</offset>
   </chunk>
</manifest>
```

*FIG. 15*

```xml
<?xml version="1.0" ?>
<unitydir>
    <path>/Users/Rob/Downloads/cloudtest1</path>
    <version>1</version>
    <direntry>
        <name>animals</name>
        <handle>16uni1327286957.dm</handle>
        <stat>
            <uid>501</uid>
            <gid>501</gid>
            <mode>16893</mode>
            <size>136</size>
            <atime>2009-06-03T15:03:33Z</atime>
            <mtime>2009-06-03T15:03:33Z</mtime>
            <ctime>2009-06-03T15:03:33Z</ctime>
        </stat>
    </direntry>
    <direntry>
        <name>characters</name>
        <handle>15uni539601204.dm</handle>
        <stat>
            <uid>501</uid>
            <gid>501</gid>
            <mode>16893</mode>
            <size>136</size>
            <atime>2009-05-21T11:07:43Z</atime>
            <mtime>2009-05-21T11:07:43Z</mtime>
            <ctime>2009-05-21T11:07:43Z</ctime>
        </stat>
    </direntry>
    <direntry>
        <name>people</name>
        <handle>16uni1089766952.dm</handle>
        <stat>
            <uid>501</uid>
            <gid>501</gid>
            <mode>16893</mode>
            <size>204</size>
            <atime>2009-06-03T14:23:46Z</atime>
            <mtime>2009-06-03T14:23:46Z</mtime>
            <ctime>2009-06-03T14:23:46Z</ctime>
        <stat>
```

*FIG. 16A*

```
        </direntry>
        <direntry>
           <name>text</name>
           <handle>15uni236152666.dm</handle>
           <stat>
              <uid>501</uid>
              <gid>501</gid>
              <mode>16893</mode>
              <size>136</size>
              <atime>2009-06-03T14:36:21Z</atime>
              <mtime>2009-06-03T14:36:21Z</mtime>
              <ctime>2009-06-03T14:36:21Z</ctime>
           </stat>
        </direntry>
        <direntry>
           <name>.DS_Store</name>
           <handle>15uni712249617.fm</handle>
           <stat>
              <uid>501</uid>
              <gid>501</gid>
              <mode>33204</mode>
              <size>6148</size>
              <atime>2009-06-03T09:52:17Z</atime>
              <mtime>2009-06-03T09:52:17Z</mtime>
              <ctime>2009-06-03T09:52:17Z</ctime>
           </stat>
        </direntry>
        <direntry>
           <name>MobileMe Gallery - Best of Disney 2009.webloc</name>
           <handle>15uni341886494.fm</handle>
           <stat>
              <uid>501</uid>
              <gid>501</gid>
              <mode>33204</mode>
              <size>303</size>
              <atime>2009-05-21T11:08:13Z</atime>
              <mtime>2009-05-21T11:08:13Z</mtime>
              <ctime>2009-05-21T11:08:13Z</ctime>
           </stat>
        </direntry>
</unitydir>
```

*FIG. 16B*

```
<?xml version="1.0" ?>
<manifest>
   <path>/Users/Rob/Downloads/cloudtest1/people</path>
   <version>1</version>
   <stat>
      <uid>501</uid>
      <gid>501</gid>
      <mode>040775</mode>
      <size>204</size>
      <atime>2009-06-03T14:23:46Z</atime>
      <mtime>2009-06-03T14:23:46Z</mtime>
      <ctime>2009-06-03T14:23:46Z</ctime>
   </stat>
   <chunk>
      <handle>15uni717992117.dc</handle>
      <length>1469</length>
      <offset>0</offset>
   </chunk>
</manifest>
```

*FIG. 17*

```
<?xml version="1.0" ?>
<manifest>
   <path>/Users/Rob/Downloads/cloudtest1/people</path>
   <version>2</version>
   <stat>
      <uid>501</uid>
      <gid>501</gid>
      <mode>040775</mode>
      <size>238</size>
      <atime>2009-06-03T15:21:16Z</atime>
      <mtime>2009-06-03T15:21:16Z</mtime>
      <ctime>2009-06-03T15:21:16Z</ctime>
   </stat>
   <chunk>
      <handle>16uni1208680209.dc</handle>
      <length>1809</length>
      <offset>0</offset>
   </chunk>
</manifest>
```

*FIG. 23*

FIG. 18A

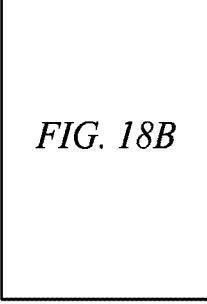

```
<?xml version="1.0" ?>
<unitydir>
   <path>/Users/Rob/Downloads/cloudtest1/people</path>
   <version>1</version>
   <direntry>
      <name>.DS_Store</name>
      <handle>15uni877860803.fm</handle>
      <stat>
         <uid>501</uid>
         <gid>501</gid>
         <mode>33204</mode>
         <size>6148</size>
         <atime>2009-06-03T14:23:51Z</atime>
         <mtime>2009-06-03T14:23:51Z</mtime>
         <ctime>2009-06-03T14:23:51Z</ctime>
      </stat>
   </direntry>
   <direntry>
      <name>IMG_0935.jpg</name>
      <handle>16uni1010882264.fm</handle>
      <stat>
         <uid>501</uid>
         <gid>501</gid>
         <mode>33204</mode>
         <size>47185</size>
         <atime>2009-05-21T11:06:42Z</atime>
         <mtime>2009-05-21T11:06:42Z</mtime>
         <ctime>2009-05-21T11:06:42Z</ctime>
      <stat>
```

FIG. 18A

```xml
</direntry>
<direntry>
   <name>IMG_0944.jpg</name>
   <handle>16uni1187812164.fm</handle>
   <stat>
      <uid>501</uid>
      <gid>501</gid>
      <mode>33204</mode>
      <size>30277</size>
      <atime>2009-05-21T11:06:47Z</atime>
      <mtime>2009-05-21T11:06:47Z</mtime>
      <ctime>2009-05-21T11:06:47Z</ctime>
   </stat>
</direntry>
<direntry>
   <name>IMG_0989.jpg</name>
   <handle>15uni610714473.fm</handle>
   <stat>
      <uid>501</uid>
      <gid>501</gid>
      <mode>33204</mode>
      <size>34485</size>
      <atime>2009-05-21T11:06:55Z</atime>
      <mtime>2009-05-21T11:06:55Z</mtime>
      <ctime>2009-05-21T11:06:55Z</ctime>
   </stat>
</direntry>
</unitydir>
```

*FIG. 18B*

```xml
<?xml version="1.0" ?>
<manifest>
    <path>/Users/Rob/Downloads/cloudtest1/people/IMG_0989.jpg</path>
    <version>1</version>
    <stat>
       <uid>501</uid>
       <gid>501</gid>
       <mode>0100664</mode>
       <size>34485</size>
       <atime>2009-05-21T11:06:55Z</atime>
       <mtime>2009-05-21T11:06:55Z</mtime>
       <ctime>2009-05-21T11:06:55Z</ctime>
    </stat>
    <chunk>
       <handle>14uni82579202.fc</handle>
       <length>10000</length>
       <offset>0</offset>
    </chunk>
    <chunk>
       <handle>15uni951914140.fc</handle>
       <length>10000</length>
       <offset>10000</offset>
    </chunk>
    <chunk>
       <handle>16uni1514832934.fc</handle>
       <length>10000</length>
       <offset>20000</offset>
    </chunk>
    <chunk>
       <handle>16uni1454426389.fc</handle>
       <length>4485</length>
       <offset>30000</offset>
    </chunk>
</manifest>
```

*FIG. 19*

```
<?xml version="1.0" ?>
<toc>
  <volume>volume1</volume>
  <manifest_ptr>
      <version>1</version>
      <start_time>2009-06-03T19:04:15Z</start_time>
      <end_time>2009-06-03T15:04:34Z</end_time>
      <handle>16uni1262054964.dm</handle>
  </manifest_ptr>
  <manifest_ptr>
      <version>2</version>
      <start_time>2009-06-03T19:04:15Z</start_time>
      <end_time>2009-06-03T15:22:17Z</end_time>
      <handle>15uni875935037.dm</handle>
  </manifest_ptr>
</toc>
```

FIG. 20

```
<?xml version= "1.0" ?>
<manifest>
   <path>/Users/Rob/Downloads/cloudtest1</path>
   <version>2</version>
   <stat>
      <uid>501</uid>
      <gid>501</gid>
      <mode>040775</mode>
      <size>272</size>
      <atime>2009-05-22T15:13:40Z</atime>
      <mtime>2009-05-22T15:13:40Z</mtime>
      <ctime>2009-05-22T15:13:40Z</ctime>
   </stat>
   <chunk>
      <handle>15uni635353623.dc</handle>
      <length>2138</length>
      <offset>0</offset>
   </chunk>
</manifest>
```

FIG. 21

```xml
<?xml version="1.0" ?>
<unitydir>
    <path>/Users/Rob/Downloads/cloudtest1</path>
    <version>2</version>
    <direntry>
        <name>animals</name>
        <handle>16uni1829893797.dm</handle>
        <stat>
            <uid>501</uid>
            <gid>501</gid>
            <mode>16893</mode>
            <size>204</size>
            <atime>2009-06-03T15:05:30Z</atime>
            <mtime>2009-06-03T15:05:30Z</mtime>
            <ctime>2009-06-03T15:05:30Z</ctime>
        </stat>
    </direntry>
    <direntry>
        <name>characters</name>
        <handle>15uni539601204.dm</handle>
        <stat>
            <uid>501</uid>
            <gid>501</gid>
            <mode>16893</mode>
            <size>136</size>
            <atime>2009-05-21T11:07:43Z</atime>
            <mtime>2009-05-21T11:07:43Z</mtime>
            <ctime>2009-05-21T11:07:43Z</ctime>
        </stat>
    </direntry>
    <direntry>
        <name>people</name>
        <handle>16uni1975545521.dm</handle>
        <stat>
            <uid>501</uid>
            <gid>501</gid>
            <mode>16893</mode>
            <size>238</size>
            <atime>2009-06-03T15:21:16Z</atime>
            <mtime>2009-06-03T15:21:16Z</mtime>
            <ctime>2009-06-03T15:21:16Z</ctime>
        </stat>
```

```xml
    </direntry>
    <direntry>
        <name>text</name>
        <handle>15uni236152666.dm</handle>
        <stat>
            <uid>501</uid>
            <gid>501</gid>
            <mode>16893</mode>
            <size>136</size>
            <atime>2009-06-03T14:36:21Z</atime>
            <mtime>2009-06-03T14:36:21Z</mtime>
            <ctime>2009-06-03T14:36:21Z</ctime>
        </stat>
    </direntry>
    <direntry>
        <name>.DS_Store</name>
        <handle>15uni712249617.fm</handle>
        <stat>
            <uid>501</uid>
            <gid>501</gid>
            <mode>33204</mode>
            <size>6148</size>
            <atime>2009-06-03T09:52:17Z</atime>
            <mtime>2009-06-03T09:52:17Z</mtime>
            <ctime>2009-06-03T09:52:17Z</ctime>
        </stat>
    </direntry>
    <direntry>
        <name>MobileMe Gallery - Best of Disney 2009.webloc</name>
        <handle>15uni341886494.fm</handle>
        <stat>
            <uid>501</uid>
            <gid>501</gid>
            <mode>33204</mode>
            <size>303</size>
            <atime>2009-05-21T11:08:13Z</atime>
            <mtime>2009-05-21T11:08:13Z</mtime>
            <ctime>2009-05-21T11:08:13Z</ctime>
        </stat>
    </direntry>
</unitydir>
```

*FIG. 22B*

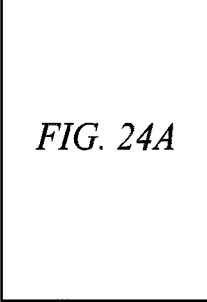

FIG. 24A

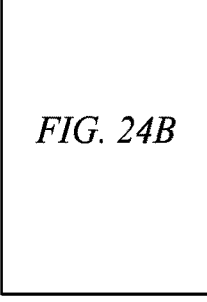

FIG. 24B

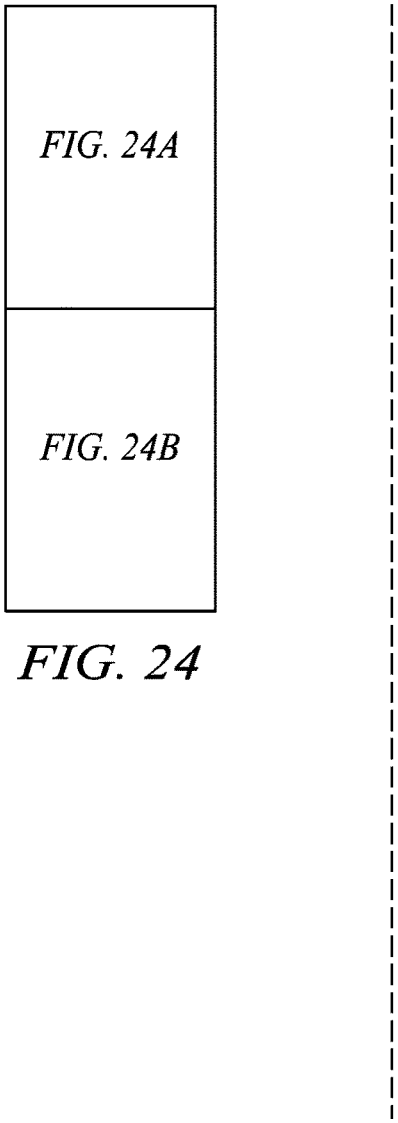

FIG. 24

```
<?xml version="1.0" ?>
<unitydir>
   <path>/Users/Rob/Downloads/cloudtest1/people</path>
   <version>2</version>
   <direntry>
      <name>.DS_Store</name>
      <handle>15uni877860803.fm</handle>
      <stat>
         <uid>501</uid>
         <gid>501</gid>
         <mode>33204</mode>
         <size>6148</size>
         <atime>2009-06-03T14:23:51Z</atime>
         <mtime>2009-06-03T14:23:51Z</mtime>
         <ctime>2009-06-03T14:23:51Z</ctime>
      </stat>
   </direntry>
   <direntry>
      <name>IMG_0935.jpg</name>
      <handle>16uni1010882264.fm</handle>
      <stat>
         <uid>501</uid>
         <gid>501</gid>
         <mode>33204</mode>
         <size>47185</size>
         <atime>2009-05-21T11:06:42Z</atime>
         <mtime>2009-05-21T11:06:42Z</mtime>
         <ctime>2009-05-21T11:06:42Z</ctime>
      </stat>
   </direntry>
   <direntry>
      <name>IMG_0944.jpg</name>
      <handle>16uni1187812164.fm</handle>
      <stat>
         <uid>501</uid>
         <gid>501</gid>
         <mode>33204</mode>
         <size>30277</size>
         <atime>2009-05-21T11:06:47Z</atime>
         <mtime>2009-05-21T11:06:47Z</mtime>
         <ctime>2009-05-21T11:06:47Z</ctime>
      </stat>
```

FIG. 24A

```
    </direntry>
    <direntry>
       <name>IMG_0989.jpg</name>
       <handle>/15uni492834687.fm</handle>
       </stat>
          <uid>501</uid>
          <gid>501</gid>
          <mode>33204</mode>
          <size>34486</size>
          <atime>2009-06-03T15:21:16Z</atime>
          <mtime>2009-06-03T15:21:16Z</mtime>
          <ctime>2009-06-03T15:21:16Z</ctime>
       </stat>
    </direntry>
    <direntry>
       <name>IMG_0989.jpg</name>
       <handle>14uni17186233.fm</handle>
       <stat>
          <uid>501</uid>
          <gid>501</gid>
          <mode>33204</mode>
          <size>44764</size>
          <atime>2009-06-02T15:17:56Z</atime>
          <mtime>2009-06-02T15:17:56Z</mtime>
          <ctime>2009-06-02T15:17:56Z</ctime>
       </stat>
    </direntry>
</unitydir>
```

*FIG. 24B*

```xml
<?xml version="1.0" ?>
<manifest>
    <path>/Users/Rob/Downloads/cloudtest1/people/IMG_0989.jpg</path>
    <version>2</version>
    <stat>
        <uid>501</uid>
        <gid>501</gid>
        <mode>0100664</mode>
        <size>34486</size>
        <atime>2009-06-03T15:21:16Z</atime>
        <mtime>2009-06-03T15:21:16Z</mtime>
        <ctime>2009-06-03T15:21:16Z</ctime>
    </stat>
    <chunk>
        <handle>14uni82579202.fc</handle>
        <length>10000</length>
        <offset>0</offset>
    </chunk>
    <chunk>
        <handle>15uni951914140.fc</handle>
        <length>10000</length>
        <offset>10000</offset>
    </chunk>
    <chunk>
        <handle>15uni136699156.fc</handle>
        <length>10000</length>
        <offset>0</offset>
    </chunk>
    <chunk>
        <handle>15uni422015761.fc</handle>
        <length>4486</length>
        <offset>10000</offset>
    </chunk>
</manifest>
```

*FIG. 25*

VERSIONED FILE SYSTEM USING STRUCTURED DATA REPRESENTATIONS

This application includes subject matter that is protected by copyright.

BACKGROUND

Technical Field

This application relates generally to data storage.

Background of the Related Art

In data centers across the world data is growing at an alarming rate. With digitization of content the paperwork of the world is turning into data bits that must be saved, protected and managed. For example, businesses that once had thick physical files and cabinets full of paper now have terabytes of data increasing at a 50% compound annual growth rate (CAGR). What was once a single MRI image is now 5 gigabytes of data for a medical firm to store and protect. The explosive growth in data is felt at all levels from the consumers to the large enterprise. There are different types of data and the invention focuses specifically on the growth of unstructured files, considered to be about 60% of the overall data, as opposed to structured data such as that found in databases, block storage devices and the like.

Unstructured file data is typically stored in local file systems or on network attached file systems (NAS). NAS devices can be built from commercially or freely available software (for example, Windows Server 2003 and Open-Filer). NAS devices also can be provided in physical or virtual (i.e. a VMWare image) forms. NAS devices have flexibility in connecting to directly-attached and storage area network (SAN) attached storage to provide for their storage needs.

The storage industry also has the introduction and growth of storage service providers (SSPs). In recent years, scalable distributed storage devices using commodity hardware have been created by a number of companies. These systems provide a number of basic and advanced attributes including capacity scalability, self healing, performance scaling, duplicate elimination, simple interfaces, etc. Some of these systems were designed and intended for large enterprises to store their fixed-content (archive) information internally, but some of these systems are being connected to the Internet to provide generic storage services. For example, Amazon's S3 service is the leading service of this nature and is being used by many Web 2.0 companies to store and scale their data capacity needs without having to provide their own storage. Storage service providers are essentially utility companies for storage and bill their customers based on the amount of data stored within their service. Amazon's S3 service has been growing rapidly showing the demand for storage provided as a service.

It is also known in the prior art to provide backup services that replicate data to services provided by the Internet. These services use software installed on a client to send data to an Internet service in a proprietary format. These are special purpose SSPs. In addition to these backup offerings, some companies are now providing generic unstructured file services to allow data to be copied to the SSP. These services either provide direct access to the SSP or synchronize files to the SSP. Each one supports a single target SSP and is generally provided as a software application or software service within the computer operating system. Often, both these types of remote storage include provisions for versioning (keeping older copies) of the data and a method to access the data online as well as locally.

BRIEF SUMMARY

An interface between an existing local file system and a data store (e.g., a "write-once" store) provides a "versioned" file system. The state of the local file system at a given point in time can be determined using the versioned file system.

Preferably, the versioned file system comprises a set of structured data representations, such as XML. In a representative embodiment, at a first time, the interface creates and exports to the data store a first structured data representation corresponding to a first version of the local file system. The first structured data representation is an XML tree having a root element, one or more directory elements associated with the root element, and one or more file elements associated with a given directory element. Upon a change within the file system (e.g., file creation, file deletion, file modification, directory creation, directory deletion and directory modification), the interface creates and exports a second structured data representation corresponding to a second version of the file system. The second structured data representation differs from the first structured data representation up to and including the root element of the second structured data representation. Thus, the second structured data representation differs from the first structured data representation in one or more (but not necessarily all) parent elements with respect to the structured data element in which the change within the file system occurred. The interface continues to generate and export structured data representations to the data store, preferably at given "snapshot" times when changes within the file system have occurred. The data store comprises any type of back-end storage device, system or architecture. In one embodiment, the data store comprises one or more cloud storage service providers. As necessary, a given structured data representation is then used to retrieve an associated version of the file system. In this manner, the versioned file system only requires write-once behavior from the data store to preserve its complete state at any point-in-time. This solution circumvents the problem of a lack of reliable atomic object replacement in object repositories.

As noted above, the interface as described herein is not limited for use with a particular type of back-end data store. Indeed, when the interface is positioned in "front" of a generic data store, the interface has the effect of turning that data store into a "versioned file system" ("VFS"). The VFS is a construct that is distinct from the interface itself, and the VFS continues to exist irrespective of the state or status of the interface (from which it may have been generated). The VFS can be accessed and managed separately from the back-end data store, or as a component of that data store.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the disclosed subject matter and the advantages thereof, reference is now made to the following descriptions taken in conjunction with the accompanying drawings, in which:

FIGS. 14-19 represent various XML elements comprising the directory tree of FIG. 11; and FIGS. 20-25 represent various XML elements comprising the directory tree of FIG. 12.

DETAILED DESCRIPTION

Figure 1:
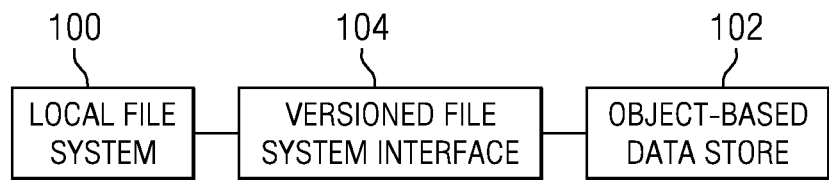
FIG. 1 is a block diagram illustrating how the subject matter of this disclosure interfaces a local file system to an object-based data store.

FIG. 1 illustrates how the subject matter of this disclosure interfaces a local file system 100 to an object-based data store 102. Although not meant to be limiting, preferably the object-based data store 102 is a "write-once" store and may comprise a "cloud" of one or more storage service providers. The subject matter is an interface 104, which provides for a "versioned file system" that only requires write-once behavior from the object-based data store 102 to preserve substantially its "complete" state at any point-in-time. As used herein, the phrase "point-in-time" should be broadly construed, and it typically refers to periodic "snapshots" of the local file system (e.g., once every "n" minutes). The value of "n" and the time unit may be varied as desired.

As will also be seen below, the interface 104 provides for a file system that has complete data integrity to the cloud without requiring global locks. In particular, this solution circumvents the problem of a lack of reliable atomic object replacement in cloud-based object repositories.

The interface 104 as described herein is not limited for use with a particular type of back-end data store. Indeed, as will be seen, when the interface is positioned in "front" of a data store, the interface has the effect of turning whatever is behind it into a "versioned file system" ("VFS"). The VFS is a construct that is distinct from the interface itself, and the VFS continues to exist irrespective of the state or status of the interface (from which it may have been generated). Moreover, the VFS is self-describing, and it can be accessed and managed separately from the back-end data store, or as a component of that data store. Thus, the VFS (comprising a set of structured data representations) is location-independent.

In one embodiment, the VFS resides within a single SSP although, as noted above, this is not a limitation. In another embodiment, a first portion of the VFS resides in a first SSP, while a second portion resides in a second SSP. Generalizing, any given VFS portion may reside in any given data store (regardless of type), and multiple VFS portions may reside across multiple data store(s). The VFS may reside in an "internal" storage cloud (i.e. a storage system internal to an enterprise), an external storage cloud, or some combination thereof.

The interface 104 may be implemented as a machine. Thus, for example, typically the interface 104 is a rack-mounted server appliance comprising hardware and software. The hardware typically includes one or more processors that execute software in the form of program instructions that are otherwise stored in computer memory to comprise a "special purpose" machine for carrying out the functionality described herein. Alternatively, the interface is implemented as a virtual machine or appliance (e.g., via VMWare, or the like), as software executing in a server, or as software executing on the native hardware resources of the local file system. One of ordinary skill in the art will appreciate that the interface 104 serves to transform the data representing the local file system (a physical construct) into another form, namely, a versioned file system comprising a series of structured data representations that are useful to reconstruct the local file system to any point-in-time. Although not meant to be limiting, preferably each structured data representation is an XML document (or document fragment). As is well-known, extensible markup language (XML) facilitates the exchange of information in a tree structure. An XML document typically contains a single root element (or a root element that points to one or more other root elements). Each element has a name, a set of attributes, and a value consisting of character data, and a set of child elements. The interpretation of the information conveyed in an element is derived by evaluating its name, attributes, value and position in the document.

The interface 104 generates and exports to the write-once data store a series of structured data representations (e.g., XML documents) that together comprise the versioned file system. The data representations are stored in the data store. Preferably, the XML representations are encrypted before export to the data store. The transport may be performed using known techniques. In particular, REST (Representational State Transfer) is a lightweight XML-based protocol commonly used for exchanging structured data and type information on the Web. Another such protocol is Simple Object Access Protocol (SOAP).

Using REST, SOAP, or some combination thereof, XML-based messages are exchanged over a computer network, normally using HTTP (Hypertext Transfer Protocol) or the like. Transport layer security mechanisms, such as HTTP over TLS (Transport Layer Security), may be used to secure messages between two adjacent nodes. An XML document and/or a given element or object therein is addressable via a Uniform Resource Identifier (URI). Familiarity with these technologies and standards is presumed.

Figure 2:
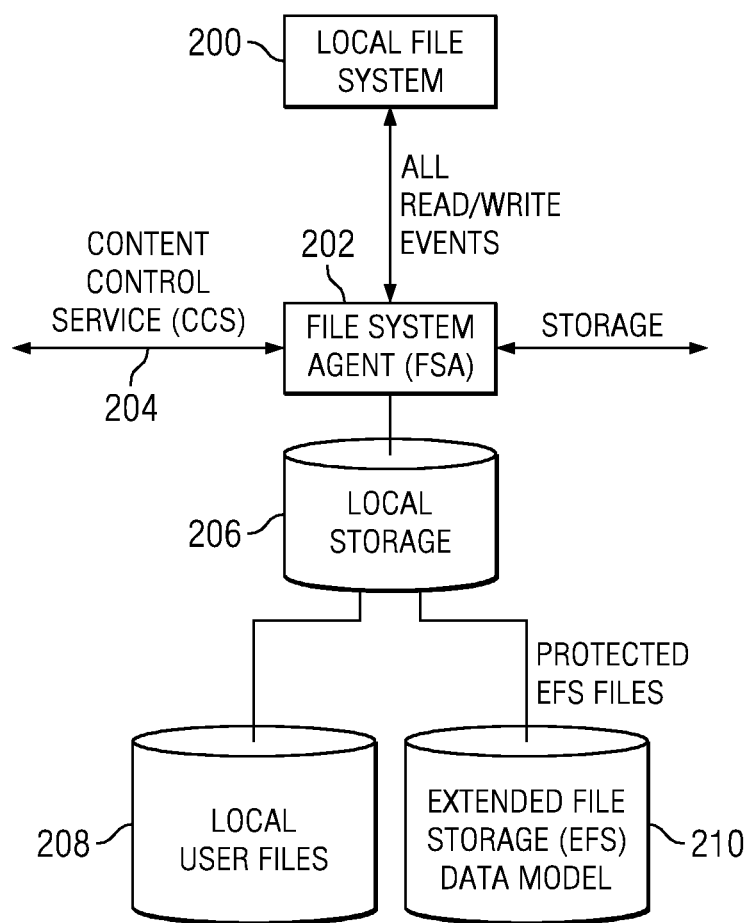
FIG. 2 is a block diagram of a representative implementation of a portion of the interface shown in FIG. 1.

FIG. 2 is a block diagram of a representative implementation of how the interface captures all (or given) read/write events from a local file system 200. In this example implementation, the interface comprises a file system agent 202 that is positioned within a data path between a local file system 200 and its local storage 206. The file system agent 202 has the capability of "seeing" all (or some configurable set of) read/write events output from the local file system. The interface also comprises a content control service (CCS) 204 as will be described in more detail below. The content control service is used to control the behavior of the file system agent. The object-based data store is represented by the arrows directed to "storage" which, as noted above, typically comprises any back-end data store including, without limitation, one or more storage service providers. The local file system stores local user files (the data) in their native form in cache 208. Reference numeral 210 represents that portion of the cache that stores pieces of metadata (the structured data representations, as will be described)) that are exported to the back-end data store (e.g., the cloud).

Figure 3:
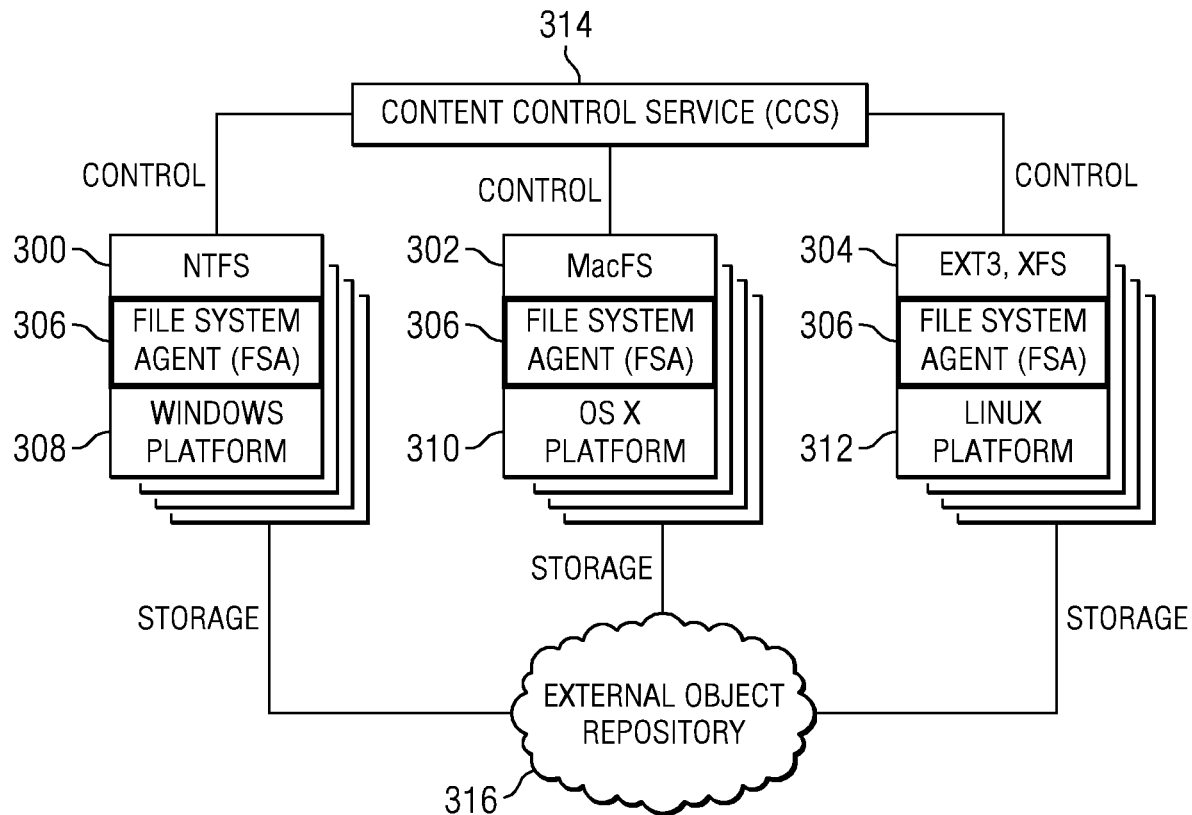
FIG. 3 is a more detailed implementation of the interface where there are a number of local file systems of different types.

FIG. 3 is a block diagram illustrating how the interface may be used with different types of local file system architectures. In particular, FIG. 3 shows the CCS (in this drawing a Web-based portal) controlling three (3) FSA instances. Once again, these examples are merely representative and they should not be taken to limit the invention. In this example, the file system agent 306 is used with three (3) different local file systems: NTFS 300 executing on a Windows operating system platform 308, MacFS 302 executing on an OS X operating system platform 310, and EXT3 or XFS 304 executing on a Linux operating system platform 312. These local file systems may be exported (e.g., via CIFS, AFP, NFS or the like) to create a NAS system based on VFS. Conventional hardware, or a virtual machine approach, may be used in these implementations, although this is not a limitation. As indicated in FIG. 3, each platform may be controlled from a single CCS instance 314, and one or more external storage service providers may be used as an external object repository 316. As noted above, there is no requirement that multiple SSPs be used, or that the data store be provided using an SSP.

Figure 4:
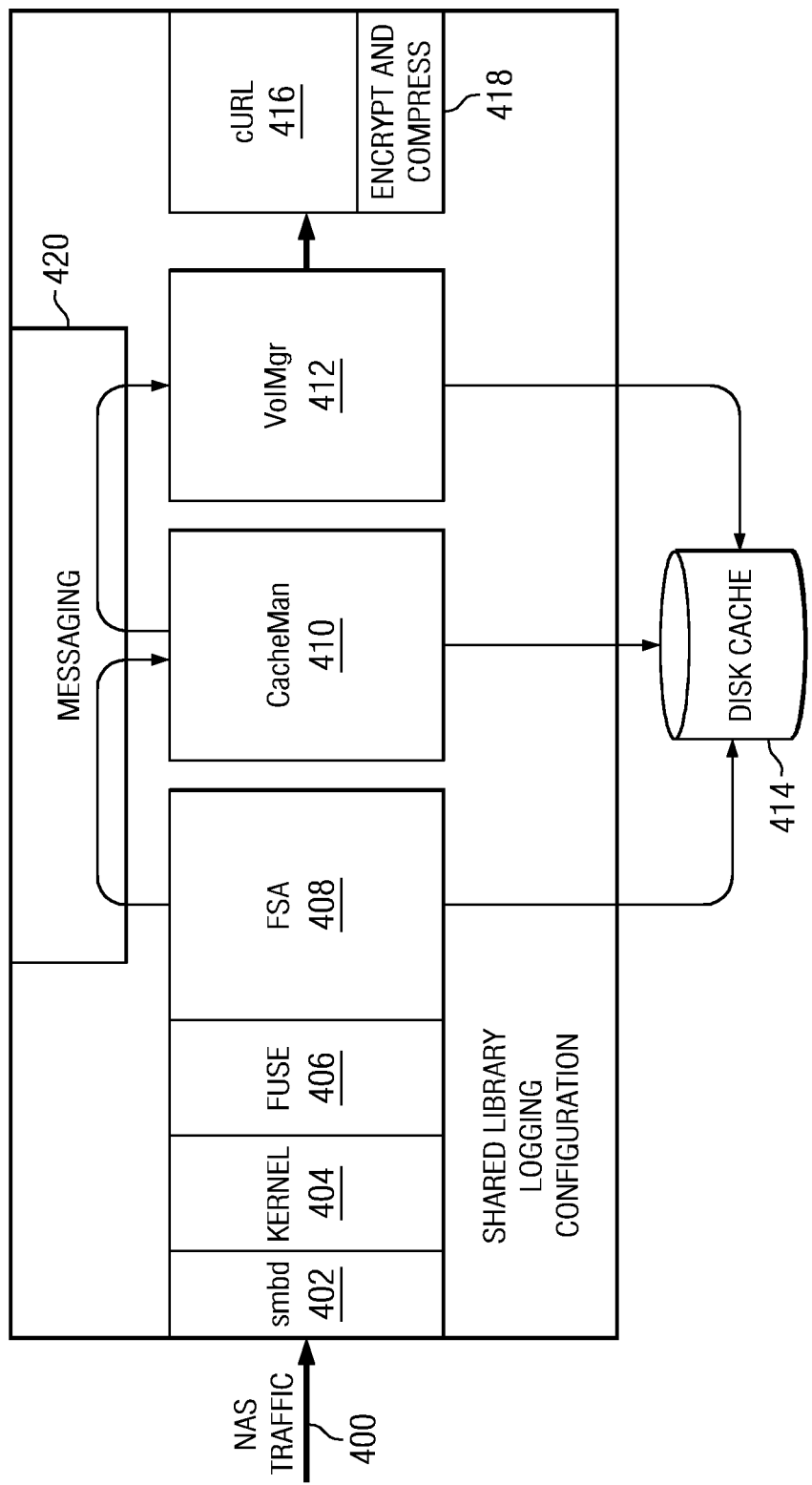
FIG. 4 illustrates the interface implemented as an appliance within a local processing environment.

FIG. 4 illustrates the interface implemented as an appliance within a local processing environment. In this embodiment, the local file system traffic 400 is received over Ethernet and represented by the arrow identified as "NAS traffic." That traffic is provided to smbd layer 402, which is a SAMBA file server daemon that provides CMS (Windows-based) file sharing services to clients. The layer 402 is managed by the operating system kernel 404 is the usual manner. In this embodiment, the local file system is represented (in this example) by the FUSE kernel module 406 (which is part of the Linux kernel distribution). Components 400, 402 and 404 are not required to be part of the appliance. The file transfer agent 408 of the interface is associated with the FUSE module 406 as shown to intercept the read/write events as described above. The CCS (as described above) is implemented by a pair of modules (which may be a single module), namely, a cache manager 410, and a volume manager 412. Although not shown in detail, preferably there is one file transfer agent instance 408 for each volume of the local file system. The cache manager 410 is responsible for management of "chunks" with respect to a local disk cache 414. This enables the interface described herein to maintain a local cache of the data structures (the structured data representations) that comprise the versioned file system. The volume manager 412 maps the root of the FSA data to the cloud (as will be described below), and it further understands the one or more policies of the cloud storage service providers. The volume manager also provides the application programming interface (API) to these one or more providers and communicates the structured data representations (that comprise the versioned file system) through a transport mechanism 416 such as cURL. cURL is a command line tool for transferring files with URL syntax that supports various protocols such as FTP, FTPS, HTTP, HTTPS, SCP, SFTP, TFTP, TELNET, DICT, LDAP, LDAPS and FILE. cURL also supports SSL certificates, HTTP POST, HTTP PUT, FTP uploading, HTTP form based upload, proxies, cookies, user+password authentication, file transfer resume, proxy tunneling, and the like. The structured data representations preferably are encrypted and compressed prior to transport by the transformation module 418. The module 418 may provide one or more other data transformation services, such as duplicate elimination. The encryption, compression, duplicate elimination and the like, or any one of such functions, are optional. A messaging layer 420 (e.g., local socket-based IPC) may be used to pass messages between the file system agent instances, the cache manager and the volume manager. Any other type of message transport may be used as well.

As noted above, the components of the interface shown in FIG. 4 may be distinct or integrated. Thus, the specific interface architecture shown in this drawing is merely illustrative and not meant to be taken by way of limitation.

The interface shown in FIG. 4 may be implemented as a standalone system, or as a managed service. In the latter case, the system executes in an end user (local file system) environment. A managed service provider provides the system (and the versioned file system service), preferably on a fee or subscription basis, and the data store (the cloud) typically is provided by one or more third party service providers. The versioned file system may have its own associated object-based data store, but this is not a requirement, as its main operation is to generate and manage the structured data representations that comprise the versioned file system. The cloud preferably is used just to store the structured data representations, preferably in a write-once manner, although the "versioned file system" as described herein may be used with any back-end data store.

As described above, the file system agent is capable of completely recovering from the cloud (or other store) the state of the native file system and providing immediate file system access (once FSA metadata is recovered). The FSA can also recover to any point-in-time for the whole file system, a directory and all its contents, a single file, or a piece of a file. These and other advantages are provided by the "versioned file system" of this disclosure, as it now described in more detail below.

Figure 5:
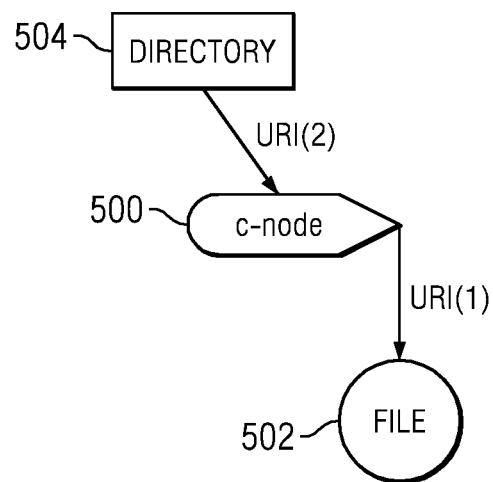
FIG. 5 illustrates a portion of a file system "tree" showing the basic component elements that are used to create a structured data representation of the "versioned" file system according to the teachings herein.

FIG. 5 is a representation of a portion of a tree showing the basic elements that are represented in a versioned file system according to the teachings herein. The reference numeral 500 is a c-node (or "cloud" node). A c-node preferably contains all of the information passed by a file system agent instance about an inode (or inode-equivalent) local file system. As will be seen in the examples below, the inode subset of the c-node includes data that would be returned by a typical "stat" function call, plus any additional extended attributes that are file system-dependent. One or more remaining parts of the c-node are used to provide a CCS super-user with additional access control and portability across specific file system instances. Stated another way, c-nodes preferably act as super-nodes for access control to files and metadata. While the inode sub-structure contains information from the original local file system, c-nodes allow administrators of the system to gain access to files in a portable, file system-independent manner. Preferably, each c-node is addressable by a URI. A c-node preferably also includes a pointer to the actual location of the data file. C-nodes indicate where the remote copies of the item may be found in the data store. The reference numeral 502 is a data file. This object represents the file preferably as it was created in the local file system. One of the main benefits to isolating the metadata in the c-nodes is that a user's data files can be stored with no modifications. As in a traditional file system, preferably the name of the file is stored in the directory or directories that contain it and not as a part of the file itself. Preferably, URIs (for the actual data files in the cloud) remain opaque to the end-users, although this is not a requirement. An FSA instance controls access to the data file URIs through the respective c-nodes. The reference numeral 504 is a directory. Directories are c-nodes that contain a simple list relating names to the corresponding URIs for other c-nodes that, in turn, point to other files or directories. Directories provide a convenient way to establish a namespace for any data set. There can be multiple directories that point to the same files or directories. As in traditional file systems, preferably symbolic links are simply multiple name entries that point to the same c-node. Directories are owned by their own c-node, which preferably holds its metadata and controls access to it.

Figure 6:
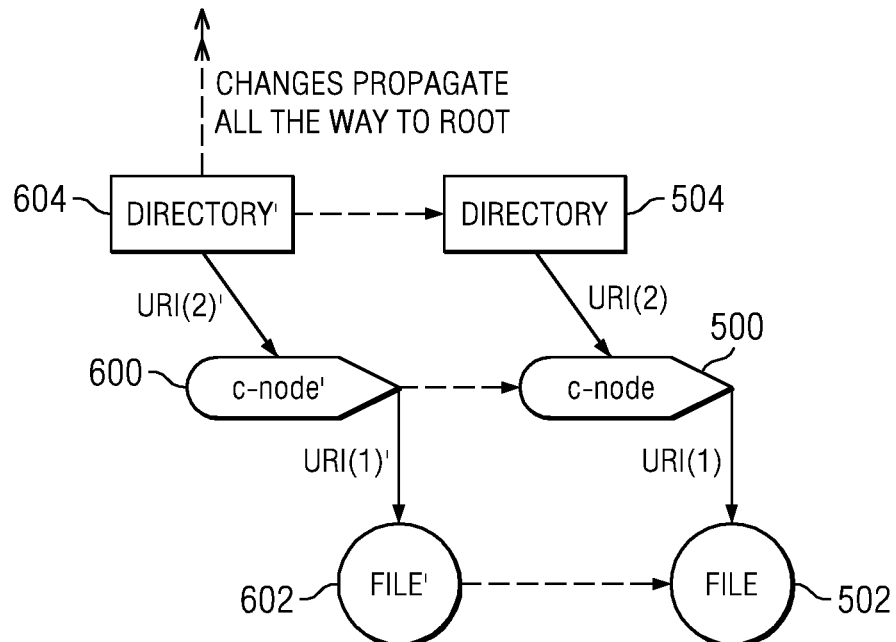
FIG. 6 illustrates the portion of the tree (as shown in FIG. 5) after a change to the contents of the file has occurred in the local file system.

FIG. 6 illustrates the portion of the tree (as shown in FIG. 5) after a change to the contents of the file 502 has occurred in the local file system. In this example, which is merely representative, a new version of the local file system is then created (preferably at a "snapshot" period, which is configurable). The new version comprises the file 602, the new c-node 600, and the new directory 604. As also seen in this drawing, the changes to the tree also propagate to the root. In particular, and according to the teachings herein, upon a given occurrence in the local file system (as will be described), a "new version" of the file system is created (for export to the cloud), and this new version is represented as a new structured data representation (e.g., a new XML document). As will be seen, the new structured data representation differs from the prior version in one or more parent elements with respect to the structured data element in which the change within the file system occurred. Thus, upon a change within the file system, the disclosed interface creates and exports to the data store a second structured data representation corresponding to a second version of the file system, and the second structured data representation differs from the first structured data representation up to and including the root element of the second structured data representation. In this manner, the interface provides for a "versioned" file system that has complete data integrity to the data store without requiring global locks. As noted, this approach circumvents the problem of a lack of reliable atomic object replacement in cloud-based object repositories.

Figure 7:
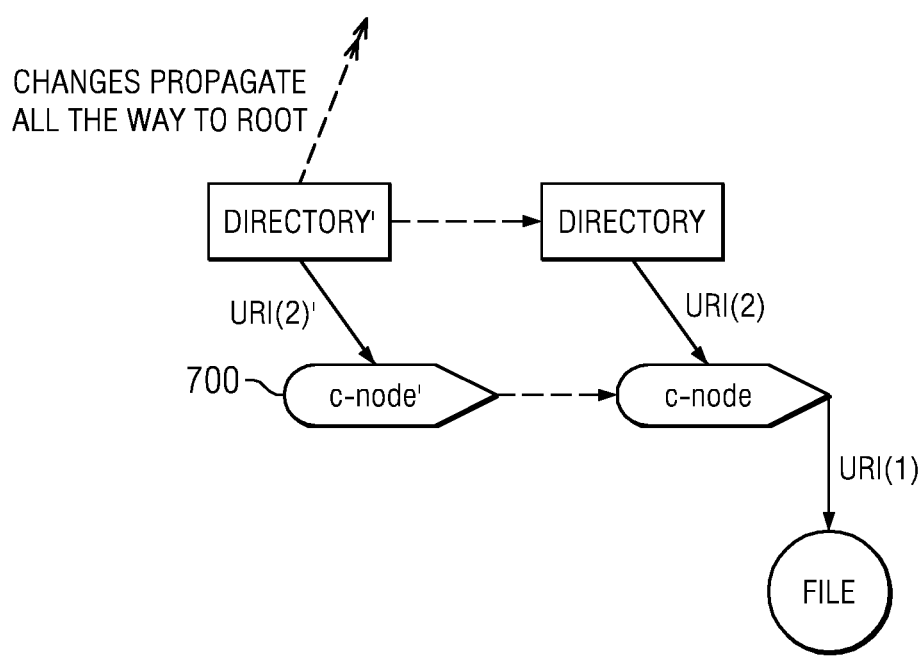
FIG. 7 illustrates the portion of the tree (as shown in FIG. 5) after a change to the contents of the c-node has occurred.
Figure 8:
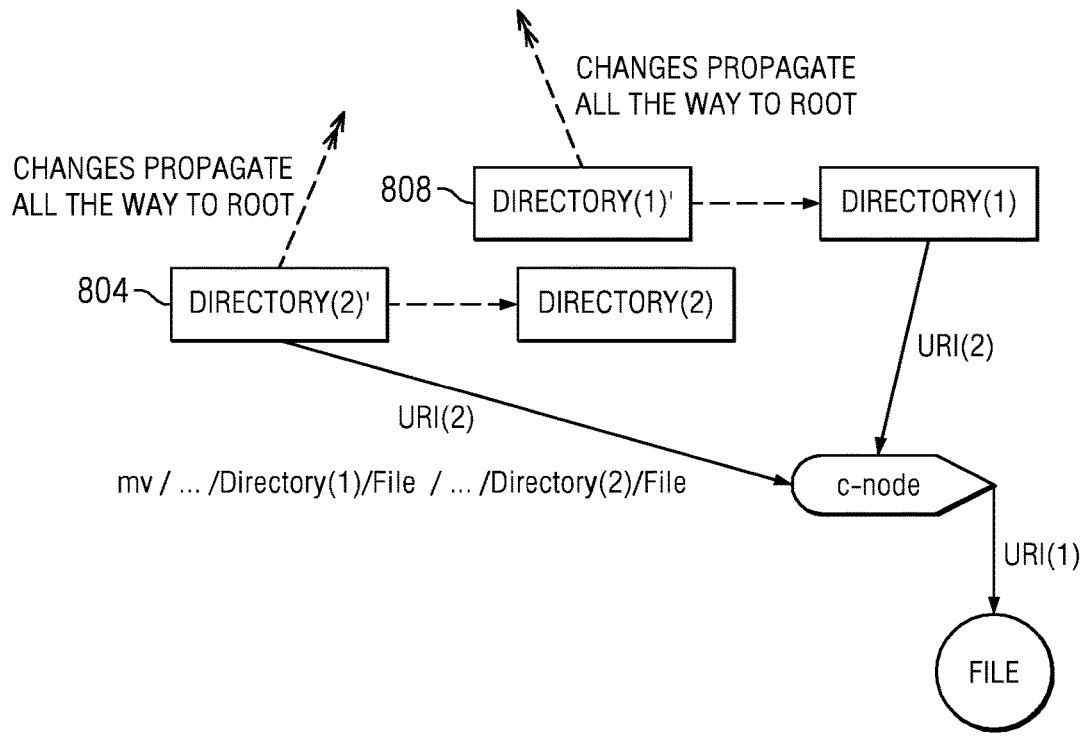
FIG. 8 illustrates the portion of the tree (as shown in FIG. 5) after a change to the contents of a directory has occurred.

FIG. 6 illustrates one type of change (a file update) that triggers the generation of a new version. FIG. 7 illustrates another type of change (an update to c-node 700) that also triggers the generation of a new version with changes propagated to root, and FIG. 8 illustrates yet another type of change (an update to each of the directories 804 and 808) that also implements a new version, once again with changes propagated to root. Generalizing, while the types of changes that trigger a new version may be quite varied, typically they include one of the following: file creation, file deletion, file modification, directory creation, directory deletion and directory modification. This list is not intended to be taken by way of limitation.

Moreover, as noted, it is possible but not required that a new version be created at the time of the actual change in the local file system; typically, the new version is created after a "snapshot" of the local file system is taken, and a number of change events may occur during a given snapshot period.

Figure 9:
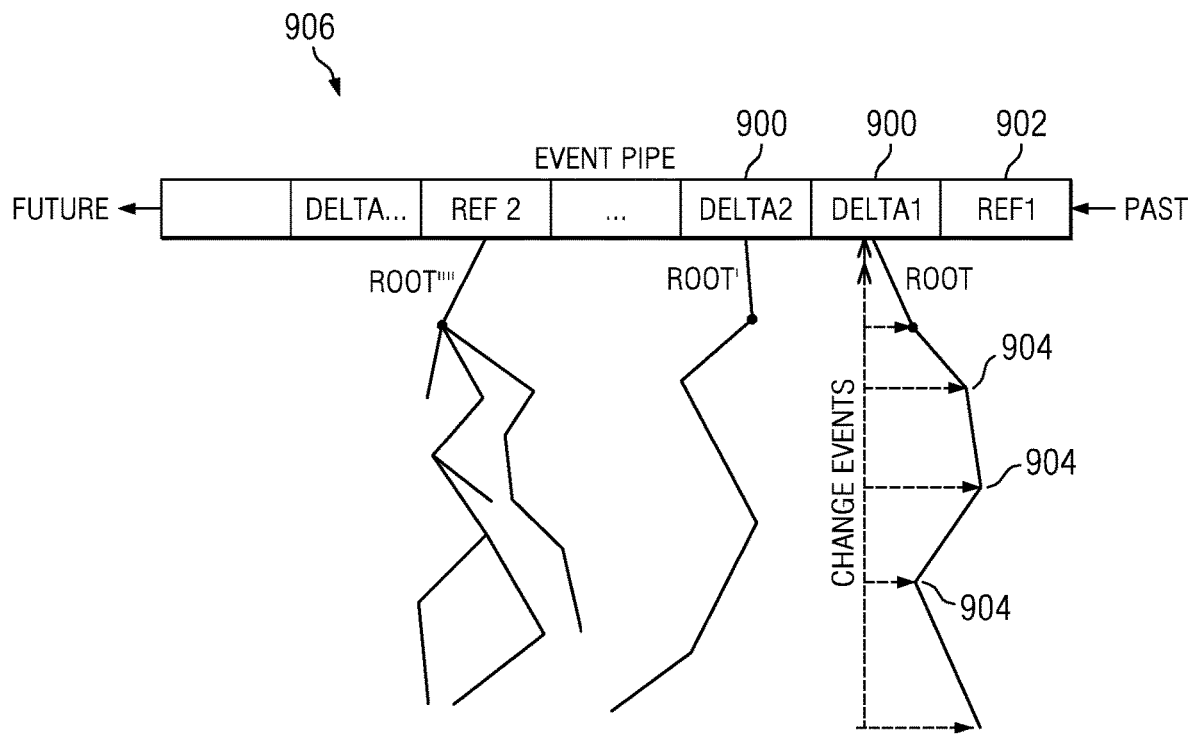
FIG. 9 illustrates how a number of file changes are aggregated during a snapshot period and then exported to the cloud as a new version.

FIG. 9 illustrates this approach. As seen in this drawing, an FSA instance preferably aggregates all of the changes to the local file system in two ways: delta frames 900, and reference frames 902. The delta frames 900 control the number (and size) of the objects that need to be stored in cloud storage. As noted above, preferably every local file system event is recorded by the FSA instance as a change event 904. As noted, new inodes, directories and files trigger corresponding new entities (created by FSA) in the cloud; however, preferably modifications to existing structures create change events that are aggregated by FSA into a single new entity, the delta frame 900. A delta frame 900 starts with a new root that represents the current state of the file system. Preferably, the FSA instance compiles the delta frame information such that each of the new entry points (i.e. any modifications to the previous version) to c-nodes, directories and files are represented as new versions of the data structures plus pointers to the old structures. To reconstruct the current state of a local file system, an FSA client only has to walk a tree for any version to see all the correct items in the tree. Reference frames 902 are also compiled by FSA and contain an aggregation of the previous reference frame plus all the intervening delta frames.

A given reference frame 902 may be thought of as an entire copy with no references to previous versions, while a delta frame 900 may be thought of as including pointers to older versions. In other words, a delta frame logically is a combination of a current version and one or more prior versions. Each reference frame may be considered a complete file system from a tree-walk perspective. This means that a walk of the tree, by itself, is all that is required to restore the file system to its associated state or point-in-time (as represented by the tree). For storage purposes, it should also be appreciated that a delta frame only takes the space required for the difference from the previous version, whereas a reference frame takes up the space of the file system. If it is desired to collapse (delete) versions, the system may create an intact reference frame following a string of deleted delta frames.

When it is desired to reconstruct the file system to a point in time (or, more generally, a given state), it is only required to walk (use) a single structured data representation (a tree). In other words, one and only one VFS tree may be used to identify a prior state of the local file system. It is not required to jump across multiple trees for this purpose.

Figures 10, 13:
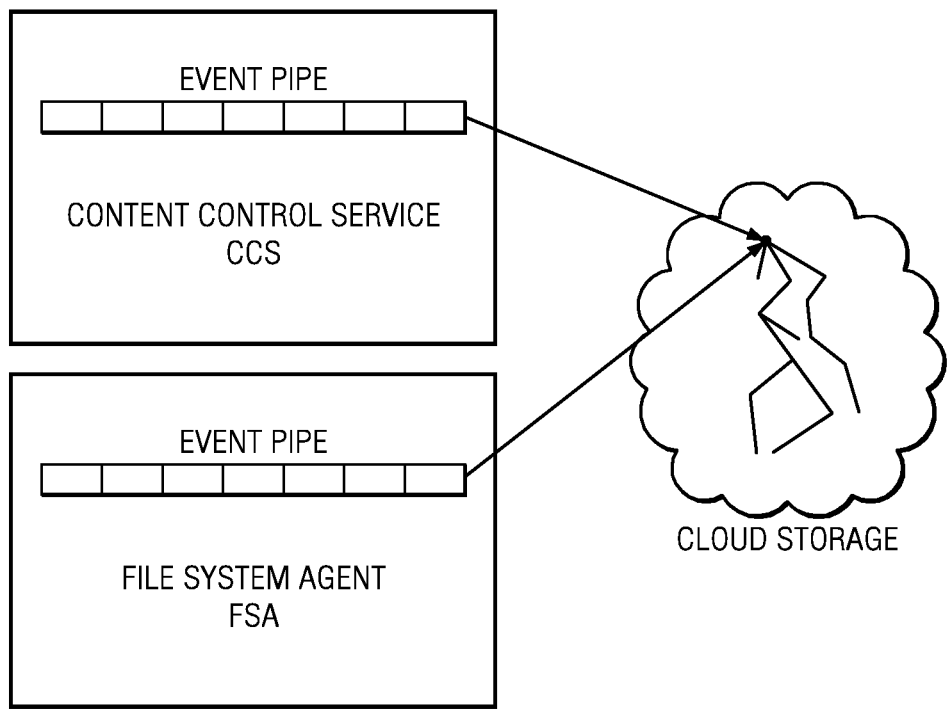
FIG. 10 illustrates how CCS maintains an event pipe.
FIG. 13 illustrates a sample directory tree.

Frames preferably are stored in an event pipe 906. As will be seen, the event pipe is implemented in a structured data representation as a table of contents (TOC), although this is not a limitation. Preferably, this data structure is held both at the FSA instance and at CCS, as illustrated in FIG. 10. The event pipe (with its entry points into cloud storage) is then the primary means to access all files stored remotely. In particular, one of ordinary skill in the art will appreciate that this is a lightweight data structure that preferably contains only versions of root for the given volume. Although it is desired that CCS be highly available, preferably the "writes" occur periodically in a transaction safe way as controlled by FSAs. The "reads" are only necessary when an FSA copy has failed; therefore, CCS can be run using an ordinary (high-availability) database or file-based back-end. Preferably, the mix of delta and reference frames in the event pipe is chosen to balance storage and bandwidth utilization against a practical recovery time for FSA to create a new local file system instance. The composition of the event pipe can also be set according to a configurable policy. For instance, users may choose to keep only so many versions or versions dating back to a specific date. If desired, a rotation schedule can be specified at CCS such that, for instance, deltas are kept daily for a month and then rolled into a monthly reference frame.

Figure 11:
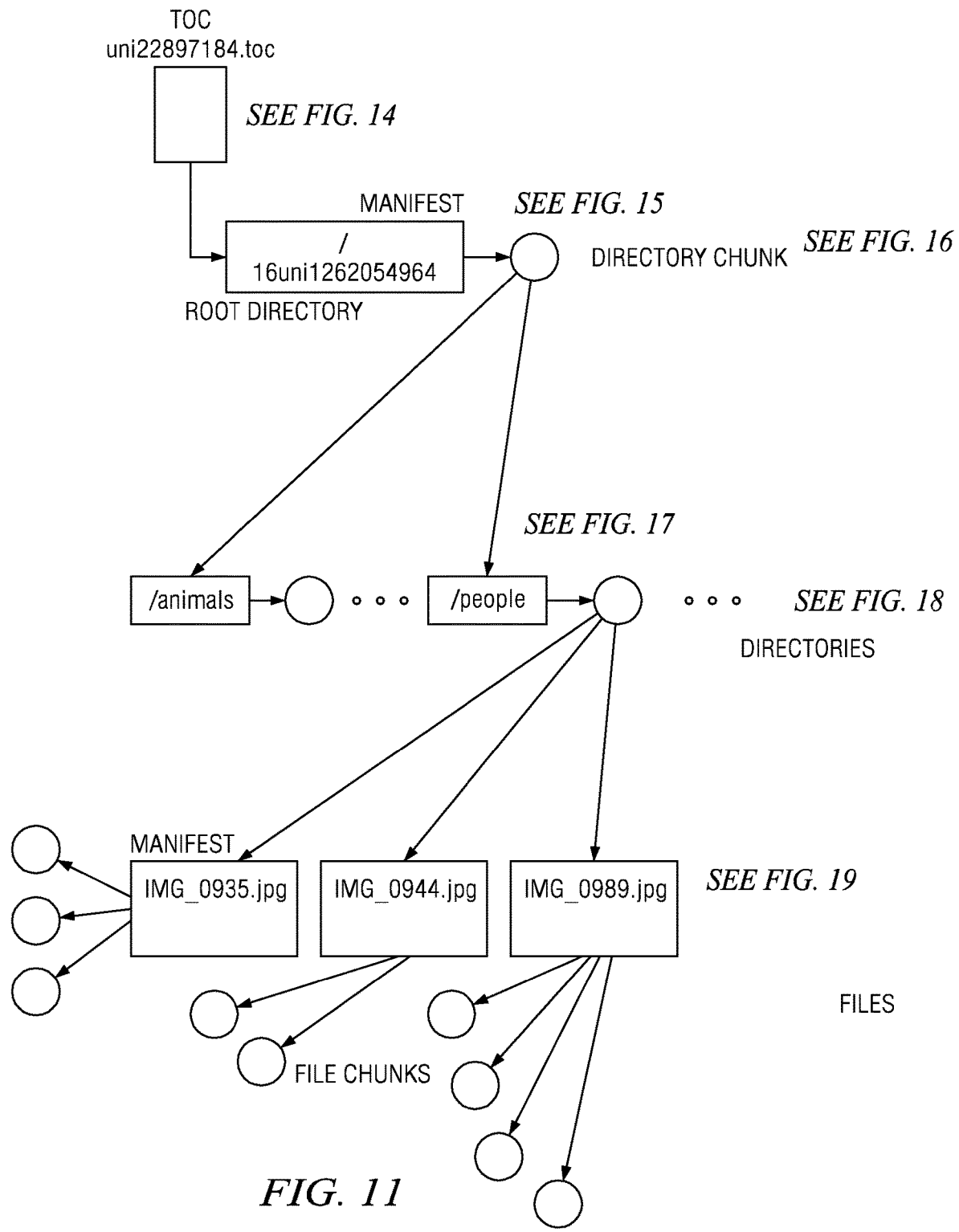
FIG. 11 illustrates a simple directory tree being pushed to the cloud.
Figure 12:
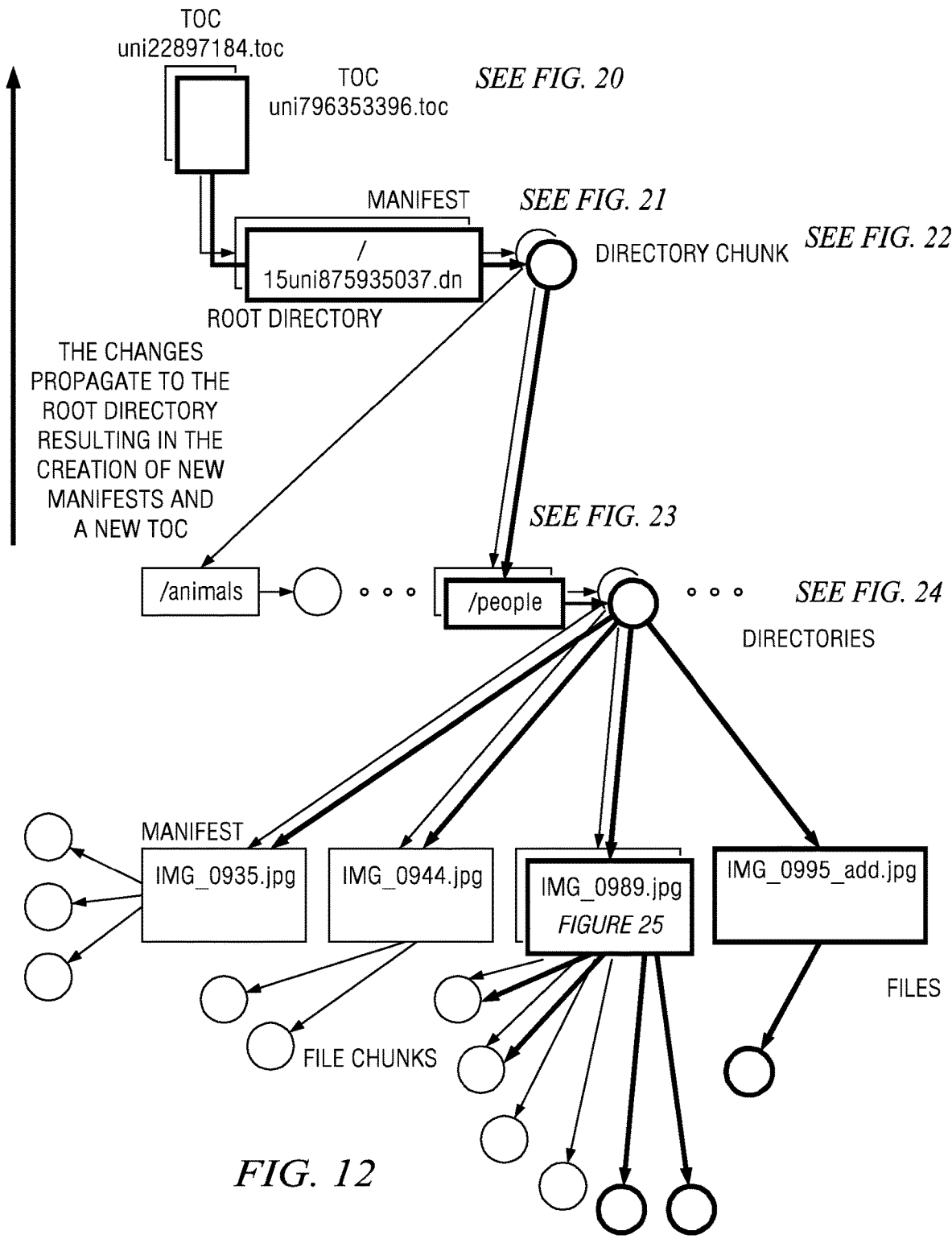
FIG. 12 illustrates the new version thereof following changes in the local file system.

The following section illustrates how the structured data representations are exported to the cloud and how the interface propagates changes to root as has been described generally above. In particular, FIG. 11 illustrates a simple directory tree being pushed to the cloud, and FIG. 12 illustrates the new version of that tree following several changes in the local file system. The original directory tree is described by the data structure in FIG. 13.

The following discussion refers to a set of structured data representations such as XML documents and document fragments. In these examples, the names used are merely representative, and they are merely object references that typically are not parsed by the system. As noted above, preferably the data structures shown in these examples are encrypted to the cloud, although the information is shown here in the clear for illustration purposes. The handle names typically have no relation to the actual file names or content. The handle names in the XML preferably are prefixed with a length component. Thus, an XML handle might be of the form "16uni1262054964.dm" while the corresponding cloud handle might be of the form "uni262054964.dm". Also, for items other than the table of contents (TOC), the path and version elements in the XML are informative and need not be used by the system. The "path" typically represents the originating path (in the local file system) when the item was last updated. The "version" typically represents the version of root at the time the item was last updated. The table of contents (TOC) is a table at the head of every version; preferably, the TOC contains references to all versions.

FIGS. 14-19 represent various elements shown in FIG. 11.

FIG. 14 represents the TOC 1400 after the initial write of the directory (in FIG. 13) to the cloud. This is a simple XML fragment. In this example, the handle is "uni22897184.toc" and this handle points to what is the root of the file system for that version.

FIG. 15 illustrates a root directory manifest, which is a structured data representation that points to directory chunks, which are used to store the directory contents themselves. In this example, there is a single directory chunk. The XML has handle "uni1262054964.dm" associated therewith.

FIG. 16 illustrates the XML for the root directory chunk, which has handle "uni1045524506.dc" associated therewith. In this directory chunk there are a set of directory elements. Each directory element has a name, and a pointer to the manifest for the directory entry. It should be noted that directory entries can be directories (sub-directories), files or other file system elements (like symbolic links). The "stat" block is a typical POSIX statinfo block and the type (directory or file) can be determined by inspecting the stat/mode item.

FIG. 17 illustrates the XML for a subdirectory manifest, in this case for the subdirectory "/people" in the directory representation of FIG. 16. This manifest has handle "uni089766952.dm" associated therewith, and this handle points to a single directory chunk.

FIG. 18 illustrates the XML for the subdirectory directory chunk, which has handle "uni717921117.dc" associated therewith. The subdirectory directory chunk has a set of directory entries, which in this case are all files. Files preferably have their own manifests.

Thus, for example, consider the file "IMG_0989.jpg," which has a full path of "/people/IMG_0989.jpg." FIG. 19 illustrates the manifest for this file, which has a handle "uni610714473.fm" associated therewith. The file manifests point to file chunks. Thus, for example, the file "/people/IMG_0989.jpg" is re-assembled by reading the file chunks and writing them to an output file "/people/IMG_0989.jpg" at the identified offsets and lengths.

A file version may be comprised of new and old chunks. For instance, a version 2 of a file may have some chunks from version 1 and some from version 2, as in the above example. The FSA preferably implements chunking (with chunks at a configurable size) to obviate copying the entire file system each time a new version is created. A version may be purged as desired to reclaim storage provided the remaining versions do not depend on it.

The above structured data representations are exported to the cloud as a "first structured data representation" and they represent a first version of the local file system. Generalizing, the versioned file system thus is a set of structured data (e.g., XML) objects.

The handles are implemented in any convenient manner, e.g., random strings generated by each FSA instance, as strings that are provided by the data store (or the SSP that manages that data store), as strings that are generated in some convenient manner, such as through use of hash algorithms, or in any other convenient manner. All that is required of the handle is that, within the context of a particular FSA instance, it is unique. In this regard, it should be appreciated that some SSPs provide a user the ability to supply a name for an object to be stored, while other SSPs do not (and provide their own). Thus, the naming conventions should take into consideration these and other naming constraints.

Now, for exemplary purposes only, assume the following change events have occurred during the relevant snapshot period (e.g., every "n" minutes): a new file "IMG_0995_add.jpg" is added to the /people directory, and some bytes in the file "IMG_0989.jpg" have been changed. It is now assumed that a snapshot has occurred. FIG. 12 illustrates the new version and its export to the cloud and in particular the changes that are propagated to root in the manner previously described. The details of this process are shown in FIGS. 20-25.

Every snapshot at which anything (e.g., data or metadata) has changed anywhere in the tree preferably causes a new TOC to be created. FIG. 20 is the XML for the new TOC, which includes handle "uni796353396.toc." Note that in the new TOC both versions of the entire file system are identified, namely: the original version (with the original root manifest pointer), and a new version (with a different root manifest version). The old TOC preferably does not include any value except as a fall-back in the event the new TOC is corrupted.

Thus, as illustrated in FIG. 20, a structured data representation may include an element (the TOC) that includes an entry per version pointing to a root manifest (directory entry) for each version. This means that at the top of the tree the system can see not only the current version of the tree but all prior versions as well. The TOC may become quite large, of course, so preferably it is implemented in a set of associated or linked structures that are referred to as "toclets," with the TOC pointing to one or more toclets as needed when the TOC gets above a certain configurable size.

FIG. 21 illustrates the XML for the new root manifest, which has a handle "uni875935037.dm". Once again, and in this example, the manifest points at a single chunk, which is also new. The manifest has a version number (for informational purposes only) that is "2" representing the second version. This means this manifest was created when the root directory version was "2."

The XML for the new root directory chunk is shown in FIG. 22. This chunk includes a handle "uni635353623.dc." The contents are similar to the prior version of this element except for the "/people" entry for which there is new directory manifest.

The XML for the subdirectory manifest (for "/people") is shown in FIG. 23. This manifest has a handle "uni717992117.dc" and points to a single directory chunk.

That chunk is shown in FIG. 24 and it has a handle "uni717992117.dc". When comparing FIG. 24 to the earlier version uni1208680209.dc), there are several changes: a new version (2), a new directory manifest and mode information for "/people/IMG_0898.jpg," and a new directory entry for the new file "/people/IMG_0995.jpg."

FIG. 25 illustrates the XML for the new file manifest for "/people/IMG_0989.jpg," which includes a handle "uni492834687.fm". Comparing this manifest with the one from the earlier version (uni610714473.fm) there are several changes: an updated version number (2), updated statinfo data, and changes in the file chunks, namely: version 1 has chunks "uni82579202.fc, uni951914140.fc, uni1514843934.fc and uni1454426389.fc," whereas version 2 has chunks "uni82579202.fc, uni951914140.fc, uni36699156.fc and uni422015761.fc."

As seen in this example, a first tree (FIG. 11 as shown in FIGS. 14-19) was written to the cloud. That tree was entirely represented starting with the root directory manifest for that initial version. The tree was then updated (FIG. 12, as shown in FIGS. 20-25), and it was again entirely represented starting with the root directory manifest for that new version. Reading either tree starting with the root directory manifest yields all the data for that version. The amount of space consumed in the cloud, however, is not twice the original capacity (of a single tree) as there are metadata (e.g., manifests, TOCs, chunks, etc.) in common between the two versions. Preferably, data is never deleted, overwritten or updated, and any version can be retrieved at any time given the latest TOC.

One of ordinary skill in the art will appreciate that the interface described herein provides a primary, local, but preferably non-resident application layer to interface the local file system to the data store. As has been described, the interface caches user data and file system metadata (organized in a unique manner) to the data store (e.g., one or more SSPs), preferably as a service. The metadata provides a level of indirection (from the data), and the VFS enables it to be stored separately from the data that it represents.

As noted above, XML is a preferred format for the structured data representation. XML is a subset of SGML (the Structured Generalized Markup Language). Thus, the structured data representation as used herein may be based on SGML, any variant or subset thereof, on a relational database model, or any other generic data model that provides a defined way to structure, describe, and interchange data.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be specially constructed for the required purposes, or it may comprise a computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A computer-readable medium having instructions stored thereon to perform the interface functions is tangible.

A given implementation of the disclosed subject matter is software written in a given programming language that runs on a server on an Intel-based hardware platform running an operating system such as Linux. As noted above, the interface may be implemented as well as a virtual machine or appliance, or in any other tangible manner.

While given components of the system have been described separately, one of ordinary skill will appreciate that some of the functions may be combined or shared in given instructions, program sequences, code portions, and the like.

Having described our invention, what we now claim is as follows.

The invention claimed is:

1. A storage-as-a-service system to provide storage for an enterprise, comprising:
    a management console to provision and manage a scalable file system across one or more cloud-based storage service providers;
    one or more file system interfaces associated with the enterprise, wherein at least one file system interface executes either as a virtual machine or on physical hardware and is configured to represent, to the enterprise, a local file system whose data is stored in one or more cloud-based storage service providers;
    wherein the one or more file system interfaces export their local file system data as a structured data representation, wherein the structured data representation associated with the at least one file system interface comprises a Uniform Resource Identifier (URI)-addressable cloud node that contains information passed by that file system interface about its associated local file system, together with an access control;
    wherein the structured data representation associated with the at least one file system interface is self-contained in that it includes or points to all data structures and data needed to reconstruct the associated local file system at a point-in-time.

2. The storage-as-a-service system as described in claim 1, wherein the structured data representation associated with the at least one file system interface comprises one or more tree-based data structures, wherein at least one tree-based data structure starts with a root that represents a current version of the local file system, and that further includes one or more change events that have been generated as a result of modification to the local file system.

3. The storage-as-a-service system as described in claim 1, wherein, from a tree-walk perspective, a tree-based data structure is a complete version of the local file system at a given point-in-time.

4. The storage-as-a-service system as described in claim 1, wherein the local file system, a directory and its contents, a given file, or a piece of a file, are restorable from the scalable file system with respect to a given time period.

5. The storage-as-a-service system as described in claim 1 wherein at least one file system interface is located on the physical hardware on-premises in the enterprise.

6. The storage-as-a-service system as described in claim 1, wherein the structured data representation associated with the at least one file system interface is a logical representation of a combination of a current version of the local file system and one or more prior versions of the local file system.

7. The storage-as-a-service system as described in claim 1 wherein the file system interface is a generic virtual file system interface that supports a set of access protocols.

8. The storage-as-a-service system as described in claim 7 wherein the set of access protocols are one of: NFS and CIFS.

9. The storage-as-a-service system as described in claim 1 wherein local file system data is encrypted prior to being exported and stored in the one or more cloud-based storage service providers.

10. The storage-as-a-service system as described in claim 1 wherein one or more of the file system interfaces are implemented as instances within a cloud computing layer.

11. The storage-as-a-service system as described in claim 1 wherein the scalable file system is a write-once object-based data store.

* * * * *